(12) United States Patent
Kang et al.

(10) Patent No.: US 12,030,978 B2
(45) Date of Patent: Jul. 9, 2024

(54) POLYURETHANE UREA ELASTIC YARN DYEABLE WITH REACTIVE DYE AND MANUFACTURING METHOD THEREFOR

(71) Applicant: HYOSUNG TNC CORPORATION, Seoul (KR)

(72) Inventors: Ji Young Kang, Seoul (KR); Yeon Soo Kang, Gyeonggi-do (KR); Tae Heon Kim, Gyeonggi-do (KR); Seong Bin Cho, Daegu (KR)

(73) Assignee: Hyosung TNC Corporation, Seoul (KR)

( * ) Notice: Subject to any disclaimer, the term of this patent is extended or adjusted under 35 U.S.C. 154(b) by 38 days.

(21) Appl. No.: 18/004,969

(22) PCT Filed: Sep. 25, 2020

(86) PCT No.: PCT/KR2020/013094
§ 371 (c)(1),
(2) Date: Jan. 10, 2023

(87) PCT Pub. No.: WO2022/025342
PCT Pub. Date: Feb. 3, 2022

(65) Prior Publication Data
US 2023/0242700 A1 Aug. 3, 2023

(30) Foreign Application Priority Data
Jul. 27, 2020 (KR) .................. 10-2020-0093015

(51) Int. Cl.
| | | |
|---|---|---|
| D01F 1/00 | (2006.01) | |
| C08G 18/12 | (2006.01) | |
| C08G 18/28 | (2006.01) | |
| C08G 18/32 | (2006.01) | |
| C08G 18/76 | (2006.01) | |
| D01F 1/10 | (2006.01) | |
| D01F 6/78 | (2006.01) | |
| D02G 3/02 | (2006.01) | |
| D02G 3/32 | (2006.01) | |
| D06P 3/02 | (2006.01) | |

(52) U.S. Cl.
CPC ......... *C08G 18/12* (2013.01); *C08G 18/2865* (2013.01); *C08G 18/3228* (2013.01); *C08G 18/7671* (2013.01); *D01F 1/10* (2013.01); *D01F 6/78* (2013.01); *D02G 3/02* (2013.01); *D02G 3/328* (2013.01); *D06P 3/028* (2013.01); *D10B 2331/30* (2013.01); *D10B 2401/061* (2013.01); *D10B 2401/14* (2013.01)

(58) Field of Classification Search
CPC ............ C08G 18/12; C08G 18/2865; C08G 18/3228; C08G 18/7671; D01F 1/10; D01F 6/78; D01F 6/70; D01F 6/72; D02G 3/02; D02G 3/328; D02G 3/32; D06P 3/028; D06P 3/248; D10B 2331/30; D10B 2401/061; D10B 2401/14; D10B 2331/10; D10B 2331/12; Y02P 70/62; D01D 5/04
USPC .......................................... 8/543
See application file for complete search history.

(56) References Cited

U.S. PATENT DOCUMENTS

| | | | | |
|---|---|---|---|---|
| 5,616,676 A | * | 4/1997 | Katsuo ............. | D01F 6/70 |
| | | | | 528/61 |
| 2011/0092628 A1 | * | 4/2011 | Shin ............... | D01F 6/70 |
| | | | | 524/424 |
| 2016/0122906 A1 | * | 5/2016 | Lee ................ | D01F 6/70 |
| | | | | 428/397 |

FOREIGN PATENT DOCUMENTS

| | | | | | |
|---|---|---|---|---|---|
| CN | 101550615 A | * | 10/2009 | ........... | D01F 6/70 |
| CN | 101724936 | | 6/2010 | | |
| CN | 102666948 A | * | 9/2012 | ........... | D01F 6/70 |
| CN | 105247121 A | * | 1/2016 | ........... | D01F 6/70 |
| CN | 107002299 A | * | 8/2017 | ........... | D01F 1/10 |
| CN | 108138373 A | * | 6/2018 | ........... | D01F 1/10 |
| CN | 108138388 A | * | 6/2018 | ........... | D01F 1/10 |
| CN | 111344441 A | * | 6/2020 | ........... | D01F 1/10 |
| JP | 3757527 B2 | * | 3/2006 | ........... | D01F 6/70 |
| KR | 10-2005-0050473 | | 5/2005 | | |
| KR | 10-0580326 | | 5/2006 | | |
| KR | 10-2010-0046927 | | 5/2010 | | |
| KR | 101238557 B1 | * | 2/2013 | ........... | D01F 6/70 |
| KR | 10-2014-0034850 | | 3/2014 | | |
| KR | 10-2014-0081515 | | 7/2014 | | |
| KR | 10-1959146 | | 3/2019 | | |
| KR | 10-2020-0024054 | | 3/2020 | | |
| WO | WO 2016104956 A1 | * | 6/2016 | ........... | D01F 1/10 |
| WO | 2020-045769 | | 3/2020 | | |
| WO | WO 2020045769 A1 | * | 3/2020 | ........... | D01F 6/70 |

OTHER PUBLICATIONS

Search Report issued in International Application No. PCT/KR2020/013094, Apr. 20, 2021, 5 pages w/translation.
Written Opinion issued in International Application No. PCT/KR2020/013094, Apr. 20, 2021, 8 pages w/translation.
Office Action issued in Chinese Patent Application No. 202080002878.2, Oct. 24, 2022, 9 pages.

* cited by examiner

*Primary Examiner* — Eisa B Elhilo
(74) *Attorney, Agent, or Firm* — HSML P.C.

(57) ABSTRACT

The present invention is directed to a reactive dye-dyeable polyurethane-urea elastic yarn including a reaction product of at least two polyols, a diisocyanate compound, a diamine chain extender, an amine chain terminator, and a diethylenetriamine compound, wherein one of the polyols is polyethylene glycol, which is included in an amount of 20 to 30.0 mol % based on the total amount of the polyols, a polyurethane-urea polymer includes 10 meq/kg to 45 meq/kg of primary amine ends, and the capping ratio (CR) of the diisocyanate to the polyols is 1.8 to 2.0.

9 Claims, No Drawings

POLYURETHANE UREA ELASTIC YARN DYEABLE WITH REACTIVE DYE AND MANUFACTURING METHOD THEREFOR

TECHNICAL FIELD

The present invention relates to a reactive dye-dyeable polyurethane-urea elastic yarn and a manufacturing method therefor, and more particularly, to a reactive dye-dyeable polyurethane-urea elastic yarn that allows polyurethane fibers, which have been recognized as not sufficiently dyeable with reactive dye, to be dyeable with reactive dye, may eliminate the grin-through problem when used in combination with other materials that dye well with reactive dye, and may improve heat resistance and color fastness to migration, and a manufacturing method therefor.

BACKGROUND ART

Polyurethane-urea elastic yarn has been widely used for stretchable clothing such as stockings, inner wear and sportswear, hygiene products, and a variety of industrial materials because of its excellent stretchability and recoverability.

In general, polyurethane-urea elastic yarn is obtained by reacting a polyol with an excess of a diisocyanate compound to obtain a prepolymer, preparing a polyurethane-urea fiber spinning dope from the prepolymer by an appropriate reaction, and then spinning the dope.

This polyurethane-urea elastic yarn has been actively used in various applications due to its inherent characteristics such as high elasticity. As the range of use thereof has expanded, new additional properties for existing fibers have been continuously required.

Polyurethane-urea elastic yarn is used in combination with various other fibers such as cotton, acrylic, wool, and silk depending on the purpose thereof, and is often blended with cellulose-based fibers such as cotton, particularly for sports or inner wear.

Polyurethane-urea elastic yarn is hydrophobic and does not have dyeing site in its molecular structure, and thus does not dye well. In particular, in the case of a fabric composed of a mixture of cotton and spandex, fabric dyeing with reactive dye is performed. However, spandex is not dyed with reactive dye, and thus when the fabric is stretched, the undyed spandex looks white on the fabric, and this grin-through problem significantly reduces the commercial value of the fabric.

Korean Patent No. 10-0580326 discloses a method of manufacturing a polyurethane-urea elastic yarn having excellent dyeability and light resistance by adding a diester compound containing a triazine-based compound and a tertiary amine to a polymer solution during manufacturing of the polyurethane-urea elastic yarn, and Korean Patent Application Publication No. 2014-0081515 discloses a spandex fiber having improved dyeability, which is manufactured by spinning a polyurethane-urea spinning dope containing a hyperbranched polymer containing a large amount of —OH groups at the ends. These technologies are technologies for improving the dyeability of spandex, but it is difficult for these technologies to improve the dyeability of polyurethane-urea elastic yarn with reactive dye.

As such, in a conventional art, there is technology for improving the dyeability of spandex with acid dye, but there is no technology for enabling dyeing with reactive dye. Until now, there has been no commercial production of spandex dyed with reactive dye, and the problem of improving the dyeability of polyurethane-urea elastic yarn with reactive dye has existed for a long period without any satisfactory solution, and thus it has been widely recognized that polyurethane fiber cannot be sufficiently dyed with reactive dye. The development of polyurethane-urea elastic yarn products that can be dyed with reactive dye has been urgently required. In particular, there has been an urgent need to develop technology capable of improving the properties of polyurethane polymer itself, rather than covering or blending.

DISCLOSURE

Technical Problem

An object of the present invention is to overcome the considerably low dyeability of polyurethane with reactive dye, which is a problem occurring in dyeing of a product obtained by spinning a mixture of polyurethane and other materials, thereby improving the dyeability of polyurethane with reactive dye, and to eliminate the grin-through problem.

The present invention is intended to solve the problem that the heat resistance is severely lowered upon use of an excessive amount of polyethylene glycol, and thus the unique physical properties of polyurethane-urea elastic yarn are lost in the dyeing or post-processing process, and another object of the present invention is to provide a polyurethane-urea elastic yarn having excellent physical properties and elasticity even after being exposed to high temperatures during a dyeing process by improving heat resistance of a polyurethane polymer, and a manufacturing method therefor.

Still another object of the present invention is to provide a polyurethane-urea elastic yarn and a manufacturing method therefor that may solve the problem of deterioration in dye migration fastness that occurs when a diethylenetriamine compound is used and may reduce color migration to other fibers by improving color fastness during dyeing with reactive dye.

Technical Solution

The present inventors have discovered that, when an excessive amount of polyethylene glycol is used as one of two polyols in the production of a polymer for manufacturing a polyurethane-urea elastic yarn, hydrophilicity may be imparted to enable dyeing with reactive dye, and the reduction in heat resistance due to the excessive amount of polyethylene glycol may be overcome by optimizing the capping ratio (CR) of the diisocyanate to the polyols within a predetermined range, thereby completing the present invention. In general, polyurethane-urea elastic yarn does not dye well with reactive dye and tends to lose its strength as an elastic yarn after exposure to high-temperature processes such a high-temperature dyeing process, and particularly, when polyethylene glycol has been used, the inherent physical properties thereof are more lost in the dyeing process. For this reason, the above-described discovery has a considerably important technical significance.

One aspect of the present invention for achieving the above-described objects is directed to a reactive dye-dyeable polyurethane-urea elastic yarn including a reaction product of at least two polyols, a diisocyanate compound, a diamine chain extender, an amine chain terminator, and a diethylenetriamine compound, wherein one of the polyols is polyethylene glycol, which is included in an amount of 20 to 30.0 mol % based on the total amount of the polyols, a polyurethane-urea polymer includes 10 meq/kg to 45 meq/kg of primary amine ends, and the capping ratio (CR) of the diisocyanate to the polyols is 1.8 to 2.0.

In the present invention, the polyols may be a combination of polytetramethylene ether glycol (PTMG) and polyethylene glycol (PEG), the molar ratio between the polytetramethylene ether glycol (PTMG) and the polyethylene glycol (PEG) may be 80:20 to 70:30, and the diethylenetriamine may be included in an amount of 100 to 300 ppm.

The intrinsic viscosity (I.V.) of the polyurethane-urea polymer of the present invention may be 1.1 to 1.3 dl/g.

The polytetramethylene ether glycol (PTMG) may have a number-average molecular weight of 1,000 to 3,000, and the polyethylene glycol (PEG) may have a number-average molecular weight of 500 to 4,000.

The reactive dye-dyeable polyurethane-urea elastic yarn of the present invention preferably has an L* value of less than 30, as calculated by the CIE lab color difference formula based on the reflectance of the yarn, measured using a spectrophotometer after dyeing in a 3% o.w.f. bath containing C.I. Reactive Black31 as reactive dye.

Another aspect of the present invention for achieving the above-described objects is directed to a method for manufacturing a polyurethane-urea elastic yarn, the method including: producing a polyurethane prepolymer by reacting two polyols with a diisocyanate compound; preparing a prepolymer solution by dissolving the polyurethane prepolymer in a solvent; subjecting the prepolymer solution and an amine solution containing a diamine chain extender, an amine chain terminator and diethylenetriamine to stirring and chain extension reaction to obtain a polyurethane-urea spinning dope containing a polyurethane-urea polymer containing 10 meq/kg to 45 meq/kg of primary amine ends; and spinning the obtained polyurethane-urea spinning dope to manufacture the polyurethane-urea elastic yarn, wherein the two polyols are a combination of polytetramethylene ether glycol (PTMG) and polyethylene glycol (PEG), the polyethylene glycol is used in an amount of 20 to 30.0 mol % based on the total amount of the polyols, diethylenetriamine is added in an amount of 100 ppm to 300 ppm on solids content during preparation of the spinning dope, and the capping ratio (CR) of the diisocyanate to the polyols in the prepolymer solution is 1.8 to 2.0.

Still another aspect of the present invention is directed to a polyurethane-urea elastic yarn obtained by dyeing the polyurethane-urea elastic yarn of the present invention with reactive dye.

Advantageous Effects

The polyurethane-urea elastic yarn of the present invention has improved hydrophilicity, which allows easy access of dye to the yarn. Therefore, the polyurethane-urea elastic yarn may be dyed with reactive dye, thereby preventing the grin-through problem and thus significantly improving the quality of fabrics or clothes.

The polyurethane-urea elastic yarn of the present invention has improved heat resistance and improved resistance to high temperature dyeing with minimal loss of physical properties, such as elastic recovery, in the case of being exposed to high temperatures, including the case of high-temperature dyeing, despite the application of technology for improving hydrophilicity.

According to the polyurethane-urea elastic yarn of the present invention and a manufacturing method therefor, it is possible to avoid color migration to other fibers, and thus it is possible to expand the range of use of the polyurethane-urea elastic yarn by using the same in combination with other materials that dye well with reactive dye that has been limited in use due to limited dyeability.

BEST MODE

Hereinafter, the present invention will be described in more detail.

In the present specification, the term [polyurethane-urea elastic yarn] means a synthetic fiber in which the fiber-forming substance is a long-chain synthetic polymer comprised of at least 85 wt % of segmented polyurethane or polyurethane-urea. The term "polyurethane-urea elastic yarn" as used herein is used interchangeably with the term "spandex."

"Meq/kg" refers to milliequivalents of the stated component per kilogram of total components, i.e., polymer solids.

One aspect of the present invention is directed to a reactive dye-dyeable polyurethane-urea elastic yarn including a reaction product of at least two polyols, a diisocyanate compound, a diamine chain extender, an amine chain terminator, and a diethylenetriamine compound, wherein one of the polyols is polyethylene glycol, which is included in an amount of 20 to 30.0 mol % based on the total amount of the polyols, a polyurethane-urea polymer includes 10 meq/kg to 45 meq/kg of primary amine ends, and the capping ratio (CR) of the diisocyanate to the polyols is 1.8 to 2.0.

The polyols may be a combination of polytetramethylene ether glycol (PTMG) and polyethylene glycol (PEG), the molar ratio between the polytetramethylene ether glycol (PTMG) and the polyethylene glycol (PEG) may be 80:20 to 70:30, and the diethylenetriamine may be included in an amount of 100 to 300 ppm.

One of the two polyols is polyethylene glycol, which is included in an amount of 20 to 30.0 mol % based on the total amount of the polyols.

The polyethylene glycol has excellent hydrophilicity, and thus when it is added in the step of producing the polyurethane prepolymer, it may improve the hydrophilicity of the polyurethane-urea elastic yarn, thereby improving the accessibility of reactive dye to the polyurethane-urea elastic yarn and enabling the dyeability of the polyurethane-urea elastic yarn with reactive dye.

In the present invention, the polyethylene glycol is preferably added in an amount of 20.0 to 30.0 mol % based on the total amount of the polyols. If the polyethylene glycol is used in an amount of less than 20 mol %, a problem may arise in that dyeing with reactive dye is difficult, and if the polyethylene glycol is used in an amount of more than 30.0 mol %, problems may arise in that spinning workability is poor due to reduced heat resistance, and it is difficult to apply the yarn to processes, due to the reduced physical properties of the yarn.

The polytetramethylene ether glycol (PTMG) may have a number-average molecular weight of 1,000 to 3,000, and the polyethylene glycol (PEG) may have a number-average molecular weight of 500 to 4,000.

The polyethylene glycol included in the polyurethane-urea elastic yarn of the present invention preferably has a weight-average molecular weight of 500 to 4,000. If the weight-average molecular weight is less than 500, the elongation of the polyurethane-urea elastic yarn will be reduced and spinning workability may be poor, and if the weight-average molecular weight is more than 4,000, the storage stability of the polymer may be insufficient due to its high melting point, making it difficult to apply the polymer to processes.

The use of diethylenetriamine in the present invention may improve polymerization stability, thereby improving the physical properties of the yarn. When diethylenetriamine is added, three amine reactive groups may rapidly participate in bonding and widen the spacing between polymer chains, which may reduce the probability of hydrogen bonding between polymer chains, thereby suppressing a rapid increase in the viscosity of the polymer.

In the present invention, the appropriate content of diethylenetriamine is 100 to 300 ppm based on the solids content of the polymer. Diethylenetriamine may maintain the inherent physical properties of the fiber while controlling the rate of increase in viscosity of the spinning dope. If the content of diethylenetriamine is less than 100 ppm, the viscosity of the spinning dope may rapidly increase, which may cause a problem in terms of storage stability of the polymer. On the other hand, if the content of diethylenetriamine is more than 300 ppm, a phenomenon may occur in which diethylenetriamine, which is a low-molecular-weight compound combined with reactive dye, migrate to other fibers, resulting in deterioration in color fastness. Diethylenetriamine (DETA) needs to be used in a minimum amount capable of reducing color migration while controlling the rapid increase in the viscosity of the spinning dope.

The polyurethane-urea elastic yarn of the present invention preferably has 10 to 45 meq/kg of amine ends. The amine ends in the yarn serve as dyeing sites capable of bonding with dye. If the yarn has less than 10 meq/kg of amine ends, a sufficient effect of improving dyeing with reactive dye may not be obtained due to the lack of dyeing sites. In addition, if the yarn has more than 45 meq/kg of amine ends, dyeability is sufficient, but a problem may arise in tams of the storage stability of the polymer due to an excessive increase in the number of amine ends.

In the present invention, an excessive amount of polyethylene glycol is used to enable dyeing with reactive dye. For this reason, the heat resistance of the polyurethane-urea elastic yarn may be seriously lowered, and thus the inherent physical properties of the polyurethane-urea elastic yarn, such as strength, may be lost in the dyeing or post-processing process. In order to overcome this problem, in the present invention, the capping ratio (CR) of the diisocyanate to the polyols in the prepolymer is adjusted within the range of 1.8 to 2.0. In a conventional art, a prepolymer was produced using a polyol and a diisocyanate at a capping ratio (CR) of less than 1.7, but if the capping ratio is less than 1.8, the problem of deterioration in heat resistance cannot be overcome, and if the capping ratio is more than 2.0, a gel may be formed during polymerization, resulting in poor spinning processability.

According to the polyurethane-urea elastic yarn of the present invention, easy access of reactive dye to the yarn is possible due to the use of an excessive amount of polyethylene glycol, and at the same time, the number of amine ends in the yarn is sufficient to provide dyeing sites, and thus the yarn is rich in reactive groups capable of bonding with reactive dye, thereby realizing dyeing of the polyurethane-urea elastic yarn.

Specific examples of the organic diisocyanate used in the manufacturing of the polyurethane-urea elastic yarn in the present invention include 4,4'-diphenylmethane diisocyanate, 1,5'-naphthalene diisocyanate, 1,4'-phenylene diisocyanate, hexamethylene diisocyanate, 1,4'-cyclohexane diisocyanate, 4,4'-dicyclohexyl methane diisocyanate, isophorone diisocyanate, etc., and one or a mixture of two or more selected from among these organic diisocyanates may be used.

As the chain extender that is used for chain extension of the prepolymer, diamine may be used. Examples of this diamine include, but are not limited to, hydrazine, ethylenediamine, 1,2-propanediamine, 1,3-propanediamine, 1,2-butanediamine(1,2-diaminobutane), 1,3-butanediamine(1,3-diaminobutane), 1,4-butanediamine(1,4-diaminobutane), 1,3-diamino-2,2-dimethylbutane, 4,4'-methylene-bis-cyclohexylamine, 1-amino-3,3,5-trimethyl-5-aminomethyl cyclohexane, 1,6-hexanediamine, 2,2-dimethyl-1,3-diaminopropane, 2,4-diamino-1-methylcyclohexane, N-methylamino-bis(3-propylamine), 2-methyl-1,5-pentanediamine, 1,5-diaminopentane, 1,4-cyclohexanediamine, 1,3-diamino4-methylcyclohexane, 1,3-cyclohexane-diamine, 1,1-methylene bis(4,4'-diaminohexane), 3-aminomethyl-3,5,5-trimethylcyclohexane, 1,3-pentane diamine(1,3-diaminopentane), m-xylene diamine, and mixtures thereof.

In the present invention, the chain terminator is generally used in chain extension reaction to control the molecular weight of polyurethane. Any chain terminator known in the art to which the present invention pertains may be used. Examples of the chain terminator include diethylamine (DEA), cyclohexylamine, butylamine, hexanol, butanol, and mixtures of two or more thereof.

Examples of the solvent that is used to improve radioactivity by adjusting the solids content of the polymer include compounds such as diethylacetamide, dimethylformamide, hexamethylphosphoramide, dimethylnitrosoamine, dimethylpropionamide, methoxydimethylacetamide, N-methylpyroridine, dimethyl sulfoxide, and tetramethylene sulfone. Thereamong, dimethylformamide or dimethylacetamide is advantageous in terms of compatibility with the polymer, spinnability and solvent recovery. The solvent is preferably used in an amount so that the solids content of the polymer is adjusted to 15 to 45%, and if the solvent is used in an amount of less than 15% or more than 45%, it may adversely affect spinnability.

The reactive dye-dyeable polyurethane-urea elastic yarn of the present invention preferably has an $L^*$ value of less than 30, as calculated by the CIE lab color difference formula based on the reflectance of the yarn, measured using a spectrophotometer after dyeing in a 3% o.w.f. bath containing C.I. Reactive Black31 as reactive dye. The $L^*$ value is more preferably less than 25, most preferably less than 20.

The reactive dye-dyeable polyurethane-urea elastic yarn of the present invention preferably has a migration fastness of grade 4 or more, as determined by attaching a dyed specimen to a cotton adjacent fabric, completely immersing the attached specimen structure in distilled water at room temperature, pouring out the water, removing excess water with two glass rods, placing the attached specimen between plastic plates of a perspirometer, applying a load of about 12.5 kPa thereto, keeping the attached specimen in the perspirometer at a temperature of 37±2° C. for 4 hours, taking out the attached specimen, drying the attached specimen in air at a temperature of 60° C., and evaluating the staining of the adjacent fabric.

Another aspect of the present invention for achieving the above-described objects is directed to a method for manufacturing a reactive dye-dyeable polyurethane-urea elastic yarn. In the method of the present invention, two polyols are polymerized with a diisocyanate compound to produce a polyurethane prepolymer, and the polyurethane prepolymer is dissolved in a solvent to prepare a prepolymer solution. The prepolymer solution and an amine solution containing a diamine chain extender, an amine chain terminator and diethylenetriamine are subjected to stirring and chain extension reaction to obtain a polyurethane-urea spinning dope. The obtained polyurethane-urea spinning dope is spun, thereby manufacturing a polyurethane-urea elastic yarn. Here, the two polyols are a combination of polytetramethylene ether glycol (PTMG) and polyethylene glycol (PEG), and the molar ratio between the polytetramethylene ether glycol (PTMG) and the polyethylene glycol (PEG) is 80:20 to 70:30.

In the present invention, the polyethylene glycol is preferably used in an amount of 20.0 to 30.0 mol % based on the total amount of the polyols. If the polyethylene glycol is used in an amount of less than 20.0 mol %, a problem may arise in that dyeing with reactive dye is difficult, and if the polyethylene glycol is used in an amount of more than 30.0 mol %, problems may arise in that spinning workability is poor due to reduced heat resistance, and it is difficult to apply the yarn to processes, due to the reduced physical properties of the yarn.

The capping ratio (CR) of the diisocyanate to the polyols in the prepolymer solution is 1.8 to 2.0. In a conventional art, a prepolymer was produced using a polyol and a diisocyanate at a capping ratio (CR) of less than 1.7, but if the capping ratio is less than 1.80, a problem may arise in that the yarn does not dye well with reactive dye, and if the capping ratio is more than 2.0, problems in process application may occur due to solubility problems caused by excessive increase of hard-segments.

In the present invention, the polyurethane-urea polymer preferably has an intrinsic viscosity (I.V.) of 1.1 to 1.3 dl/g. In the present invention, the number of amine ends (that serve as dyeing sites capable of bonding with reactive dye) in the polyurethane-urea elastic yarn is increased. For this reason, post-polymerization may not proceed, resulting in a decrease in the intrinsic viscosity of the yarn, and as a result, basic physical properties such as strength and elongation may be reduced or the storage stability of the polymer may be poor. In order to overcome this problem, in the present invention, it is necessary to secure the intrinsic viscosity of the polymer at 1.1 to 1.3 dl/g in the polyurethane polymer production step. Since the number of amine ends and the intrinsic viscosity of the polymer are in inverse proportion to each other, it is difficult to simultaneously achieve dyeability, excellent intrinsic physical properties and heat resistance of polyurethane. In the present invention, various conditions are adjusted so that physical properties such as excellent elasticity and strength inherent in polyurethane are not impaired while securing a sufficient number of amine ends to allow dyeing with reactive dye.

In the present invention, diethylenetriamine (DETA) is used in secondary polymerization. The diethylenetriamine reduces the probability of hydrogen bonding between polymer chains and suppresses a rapid increase in viscosity of the polymer, thereby improving polymerization stability and ultimately improving the physical properties of the yarn. However, the diethylenetriamine is preferably used in a minimum amount of 100 to 300 ppm, because the amine reactive groups can be combined with reactive dye and the diethylenetriamine may detach due to its low molecular weight, causing color migration.

In the spinning and winding steps, the spinning dope is degassed and dry-spun at a spinning temperature of 230 to 300° C., followed by winding at a winding speed of 500 to 1,500 m/min.

Hereinafter, the present invention will be described in more detail with reference to examples, but these examples are only for illustrating the practice of the present invention. The present invention is not limited to these examples.

EXAMPLES

Example 1

20.0 mol % of polyethylene glycol (molecular weight: 2,000) was mixed with 88.3 kg of polytetramethylene ether glycol (PTMG, molecular weight: 1,800), and then 28.5 kg of 4,4'-diphenylmethane diisocyanate was added thereto. The mixture was allowed to react with stirring at 90° C. for 120 minutes under a nitrogen gas atmosphere, thereby producing a polyurethane prepolymer having isocyanate at both ends. The prepolymer was cooled to room temperature, and then 213.8 kg of dimethylacetamide as a solvent was added thereto to obtain a polyurethane prepolymer solution. Subsequently, 3.5 kg of ethylenediamine as a chain extender, 0.3 kg of diethylamine as a chain terminator, and 200 ppm of diethylenetriamine as a viscosity stabilizer were dissolved in 50 kg of dimethylacetamide and added to the prepolymer solution at 10° C. or less to obtain a polyurethane-urea solution having an intrinsic viscosity (I.V.) of 1.2 dl/g. Additionally, 1.5 wt % of triethylene glycol-bis-3-(3-tert-butyl hydroxyphenyl)propionate as an antioxidant, 4 wt % of hydrotalcite ($Mg_4Al_2(OH)$ $12CO_3 \cdot 3H_2O$) as an inorganic chlorine resistance agent, and 0.5 wt % of titanium dioxide as a light stabilizer were added to the polyurethane-urea solution, thus preparing a polyurethane-urea spinning dope. The spinning dope obtained as described above was dry-spun at a speed of 900 m/min, thereby manufacturing a polyurethane-urea elastic yarn having 40 denier/3 filaments and 30 meq/kg amine ends.

Example 2

A polyurethane-urea elastic yarn was manufactured in the same manner as in Example 1, except that 25 mol % of polyethylene glycol (molecular weight: 2,000) was added in the prepolymer production process of Example 1.

Example 3

A polyurethane-urea elastic yarn was manufactured in the same manner as in Example 1, except that 30 mol % of polyethylene glycol (molecular weight: 2,000) was added in the prepolymer production process of Example 1.

Examples 4 to 7

Polyurethane-urea elastic yarns were manufactured in the same manner as in Example 2, except that the number of amine ends in the yarn was changed as shown in Table 1 below.

Examples 8 to 12

Polyurethane-urea elastic yarns were manufactured in the same manner as in Example 2, except that the capping ratio (CR) of the diisocyanate to the polyols was changed as shown in Table 1 below.

Examples 13 and 14

Polyurethane-urea elastic yarns were manufactured in the same manner as in Example 2, except that the intrinsic viscosity of the polyurethane-urea solution was changed as shown in Table 1 below.

Examples 15 to 18

Polyurethane-urea elastic yarns were manufactured in the same manner as in Example 2, except that the number of amine ends in the yarn and the amount of diethylenetriamine added during the process of preparing the polyurethane-urea solution were changed as shown in Table 1 below.

Examples 19 to 20

Polyurethane-urea elastic yarns were manufactured in the same manner as in Example 1, except that a polyethylene glycol having a molecular weight shown in Table 1 below was used.

Comparative Example 1

A polyurethane-urea elastic yarn was manufactured in the same manner as in Example 1, except that polyethylene glycol was not mixed with 117.7 kg of polytetramethylene ether glycol (PTMG, molecular weight: 1,800) during the process of producing the prepolymer.

Comparative Examples 2 to 4

Polyurethane-urea elastic yarns were manufactured in the same manner as in Comparative Example 1, except that the amount of polyethylene glycol (molecular weight: 2,000) used was changed as shown in Table 1 below.

Comparative Examples 5 to 8

Polyurethane-urea elastic yarns were manufactured in the same manner as in Comparative Example 1, except that the number of amine ends in the yarn was changed as shown in Table 1 below.

Comparative Examples 9 to 13

Polyurethane-urea elastic yarns were manufactured in the same manner as in Comparative Example 1, except that the capping ratio (CR) of the diisocyanate to the polyols was changed as shown in Table 1 below.

Test Example

The physical properties of the polyurethane-urea elastic yarns manufactured in the Examples and the Comparative Examples were evaluated by the following method, and the results are shown in Table 1 below.

(1) Heat Resistance of Yarn (Strength Retention Before and After Heat Treatment)

Using an automatic strength/elongation testing device, the elongation between 0 and 300% was repeated five times, the stress at 200% (P1) and the stress after heat treatment (P2) were measured at the fifth elongation. The measured values were expressed as the heat resistance using the following equation. In this case, for heat treatment of the yarn, the yarn was stretched 100% in a state exposed to the air, and then dry-heat-treated at 190° C. for 1 minute, cooled to room temperature, wet-heat-treated at 100° C. for 30 minutes in a relaxed state, and then dried at room temperature.

$$\text{Heat resistance (\%)} = P2/P1 \times 100$$

(2) L* Value

For measurement of the L* value indicating the degree of dyeing, the reflectance of the yarn was measured using a spectrophotometer, and based on the measured value, the L* value was calculated using the CIE Lab color difference formula. The L* value indicates lightness, and when the yarn is dyed with the same dye, a darker color indicates a lower L* value.

(Dyeing Method)

C.I. Reactive Black31 was used as reactive dye, the o.w.f. was set to 3%, and the bath ratio was set to 1:20. The dye and the sample were placed in the prepared dye bath containing 60 g/L $Na_2SO_4$, and then warmed to 60° C. at a rate of 2° C./min. When 60° C. was reached, 20 g/L $Na_2CO_3$ was added, and the dye bath was maintained for 60 minutes, cooled to room temperature, followed by washing with water. Washing and draining were repeated until the color did not come out in the drainage water.

(3) Color Fastness to Migration

ISO 105 E01 test method was used. A dyed specimen was attached to a cotton adjacent fabric, and then completely immersed in distilled water at room temperature. The water was poured out, and excess water was removed with two glass rods. Then, the attached specimen was placed between plastic plates of a perspirometer, and a load of about 12.5 KPa was applied thereto. In this state, the attached specimen was kept in the perspirometer at a temperature of 37±2° C. for 4 hours, taken out, and dried in air at a temperature of 60° C., and the staining of the adjacent fabric was evaluated. For evaluation of the staining, it was classified into nine grades (1, 1-2, 2, 2-3, 3, 3-4, 4, 4-5, and 5) using the gray scale for evaluating staining. Grade 5 means that no contamination occurs. The closer to grade 5, the less the staining.

(4) Storage Stability of Polymer

A sample of the prepared urethane-urea solution was placed in a transparent glass vial without bubbles, and the turbidity thereof was measured using a turbidity colorimeter. When the turbidity was 0.4 or more, it was determined that the change in viscosity per hour of the polymer was 200 P/hr or more, indicating that the storage stability of the polymer was poor.

(5) Spinning Workability

When the full bobbin rate (%) during spinning work was less than 90%, it was determined that the spinning workability was poor.

$$\text{Full bobbin rate (\%)} = (\text{full bobbin production/total production}) \times 100$$

TABLE 1

| Example ID | PEG molecular weight | PEG content (mol %) | Yarn amine ends (meq/kg) | CR | Polymer LV (dl/g) | DETA content | Process applicability | | Heat resistance (strength retention rate | |
|---|---|---|---|---|---|---|---|---|---|---|
| | | | | | | | Polymer storage stability | Spinning workability | L*value | (%) after heat treatment) | Color fastness to migration |
| Example 1 | 2000 | 20 | 30 | 1.90 | 1.2 | 200 | Good | Good | 14.5 | 65.8 | Grade 4 |
| Example 2 | 2000 | 25 | 30 | 1.90 | 1.2 | 200 | Good | Good | 12.7 | 63.2 | Grade 4 |

TABLE 1-continued

| Example ID | PEG molecular weight | PEG content (mol %) | Yarn amine ends (meq/kg) | CR | Polymer LV (dl/g) | DETA content | Process applicability - Polymer storage stability | Process applicability - Spinning workability | L*value | Heat resistance (strength retention rate (%) after heat treatment) | Color fastness to migration |
|---|---|---|---|---|---|---|---|---|---|---|---|
| Example 3 | 2000 | 30 | 30 | 1.90 | 1.2 | 200 | Good | Good | 9.3 | 60.1 | Grade 4 |
| Example 4 | 2000 | 25 | 10 | 1.90 | 1.2 | 200 | Good | Good | 17.1 | 67.7 | Grade 4 |
| Example 5 | 2000 | 25 | 20 | 1.90 | 1.2 | 200 | Good | Good | 14.6 | 65.4 | Grade 4 |
| Example 6 | 2000 | 25 | 30 | 1.90 | 1.2 | 200 | Good | Good | 7.6 | 60.3 | Grade 4 |
| Example 7 | 2000 | 25 | 45 | 1.90 | 1.2 | 200 | Good | Good | 5.9 | 57.9 | Grade 4 |
| Example 8 | 2000 | 25 | 30 | 1.80 | 1.2 | 200 | Good | Good | 8.8 | 50.1 | Grade 4 |
| Example 9 | 2000 | 25 | 30 | 1.83 | 1.2 | 200 | Good | Good | 9.6 | 57.3 | Grade 4 |
| Example 10 | 2000 | 25 | 30 | 1.88 | 1.2 | 200 | Good | Good | 10.4 | 60.6 | Grade 4 |
| Example 11 | 2000 | 25 | 30 | 1.95 | 1.2 | 200 | Good | Good | 12.9 | 65.5 | Grade 4 |
| Example 12 | 2000 | 25 | 30 | 2.00 | 1.2 | 200 | Good | Good | 13.8 | 68.4 | Grade 4 |
| Example 13 | 2000 | 25 | 30 | 1.90 | 1.1 | 200 | Good | Good | 11.9 | 61.7 | Grade 4 |
| Example 14 | 2000 | 25 | 30 | 1.90 | 1.3 | 200 | Good | Good | 12.6 | 67.4 | Grade 4 |
| Example 15 | 2000 | 25 | 10 | 1.90 | 1.2 | 100 | Good | Good | 17.4 | 67.0 | Grade 4 |
| Example 16 | 2000 | 25 | 20 | 1.90 | 1.2 | 100 | Good | Good | 7.9 | 61.9 | Grade 4 |
| Example 17 | 2000 | 25 | 30 | 1.90 | 1.2 | 100 | Good | Good | 5.5 | 57.2 | Grade 4 |
| Example 18 | 2000 | 25 | 45 | 1.90 | 1.2 | 300 | Good | Good | 5.1 | 56.9 | Grade 4 |
| Example 19 | 1000 | 25 | 30 | 1.90 | 1.2 | 200 | Good | Good | 15.5 | 61.5 | Grade 3 |
| Example 20 | 3000 | 25 | 30 | 1.90 | 1.2 | 200 | Good | Good | 15.1 | 67.8 | Grade 3 |
| Comparative Example 1 | 2000 | 0 | 45 | 1.90 | 1.2 | 200 | Good | Good | 59.6 | 73.5 | Grade 3-4 |
| Comparative Example 2 | 2000 | 10 | 30 | 1.90 | 1.2 | 200 | Good | Good | 38.3 | 71.2 | Grade 3 |
| Comparative Example 3 | 2000 | 15 | 45 | 1.90 | 1.2 | 200 | Good | Good | 33.9 | 59.8 | Grade 3 |
| Comparative Example 4 | 2000 | 35 | 30 | 1.90 | 1.2 | 200 | Good | Poor | — | — | — |
| Comparative Example 5 | 2000 | 0 | 5 | 1.90 | 1.2 | 200 | Good | Good | 61.7 | 78.9 | Grade 3-4 |
| Comparative Example 6 | 2000 | 25 | 7 | 1.90 | 1.2 | 200 | Good | Good | 38.6 | 69.8 | Grade 3 |
| Comparative Example 7 | 2000 | 25 | 50 | 1.90 | 1.2 | 200 | Poor | Good | 5.2 | 53.6 | Grade 3 |
| Comparative Example 8 | 2000 | 25 | 30 | 1.70 | 1.0 | 200 | Good | Good | 8.1 | 32.2 | Grade 3 |
| Comparative Example 9 | 2000 | 25 | 30 | 1.70 | 1.2 | 200 | Good | Good | 8.4 | 34.4 | Grade 3 |
| Comparative Example 10 | 2000 | 25 | 30 | 1.77 | 1.2 | 200 | Good | Good | 8.7 | 38.1 | Grade 3 |
| Comparative Example 11 | 2000 | 30 | 30 | 1.77 | 1.2 | 200 | Good | Good | 7.9 | 37.3 | Grade 3 |
| Comparative Example 12 | 2000 | 25 | 30 | 2.30 | 1.2 | 200 | Poor | Good | 13.6 | 68.0 | Grade 3 |

It was confirmed that the polyurethane-urea elastic yarns of Examples 1 to 20 according to the present invention have excellent heat resistance and color fastness to migration while being dyeable with reactive dye.

On the other hand, in the case of Comparative Examples 1 to 3 in which the PEG content was less than 20 mol %, the improvement in dyeability was insufficient, and thus the L* value was significantly different from that in the Examples, whereas in the case of Comparative Example 4 in which the PEG content was more than 30 mol %, the heat resistance was significantly low, and thus the spinning workability was poor, indicating that it was difficult to apply the yarn to processes.

In the case of Comparative Examples 5 to 7 in which the amine ends of the yarn were less than 10 meq/kg, dyeability was insufficient due to insufficient dyeing sites in the yarn. In the case of Comparative Example 8 in which the amine ends of the yarn were more than 45 meq/kg, the dyeability was good, but the storage stability was poor due to a rapid increase in the viscosity of the polymer, indicating that it was difficult to apply the yarn to processes.

In the case of Comparative Examples 8 to 11 in which the capping ratio (CR) was less than 1.80, a problem arose in that the heat resistance was low, resulting in a serious decrease in physical properties during post-processing of the yarn. In the case of Comparative Example 12 in which the CR was greater than 2.0, a problem arose in that the number of hard segments in the polymer increased, resulting in phase separation from the solvent and a rapid increase in the viscosity of the polymer.

The present invention described above is not limited by the foregoing embodiments and the accompanying drawings, and it will be apparent to those skilled in the art that various substitutions, modifications, and changes are possible without departing from the technical spirit of the present invention.

The invention claimed is:

1. A reactive dye-dyeable polyurethane-urea elastic yarn comprising a reaction product of at least two polyols, a diisocyanate compound, a diamine chain extender, an amine chain terminator, and a diethylenetriamine compound, wherein one of the polyols is polyethylene glycol, which is comprised in an amount of 20 to 30.0 mol % based on the total amount of the polyols, the yarn comprises 10 meq/kg to 45 meq/kg of primary amine ends, and a capping ratio (CR) of the diisocyanate to the polyols is 1.8 to 2.0.

2. The reactive dye-dyeable polyurethane-urea elastic yarn of claim 1, wherein the polyols are a combination of polytetramethylene ether glycol (PTMG) and polyethylene glycol (PEG), and a molar ratio between the polytetramethylene ether glycol (PTMG) and the polyethylene glycol (PEG) is 80:20 to 70:30.

3. The reactive dye-dyeable polyurethane-urea elastic yarn of claim 1, wherein the diethylenetriamine is comprised in an amount of 100 to 300 ppm.

4. The reactive dye-dyeable polyurethane-urea elastic yarn of claim 1, wherein the polyurethane-urea polymer has an intrinsic viscosity (I.V.) of 1.1 to 1.3 dl/g.

5. The reactive dye-dyeable polyurethane-urea elastic yarn of claim 1, wherein the polyethylene glycol (PEG) has a number-average molecular weight of 500 to 4,000.

6. The reactive dye-dyeable polyurethane-urea elastic yarn of claim 1, wherein the polyurethane-urea elastic yarn has an L* value of less than 30, as calculated by the CIE lab color difference formula after dyeing in a 3% o.w.f. dye bath containing C.I. Reactive Black 31 as reactive dye, 60 g/L $Na_2SO_4$, and 20 g/L $Na_2CO_3$, at a bath ratio of 1:20 at 60° C. for 60 minutes.

7. A method for manufacturing a polyurethane-urea elastic yarn, the method comprising: producing a polyurethane prepolymer by reacting two polyols with a diisocyanate compound; preparing a prepolymer solution by dissolving the polyurethane prepolymer in a solvent; subjecting the prepolymer solution and an amine solution containing a diamine chain extender, an amine chain terminator and diethylenetriamine to stirring and chain extension reaction to obtain a polyurethane-urea spinning dope containing a polyurethane-urea polymer containing 10 meq/kg to 45 meq/kg of primary amine ends; and spinning the obtained polyurethane-urea spinning dope to manufacture the polyurethane-urea elastic yarn; wherein the two polyols are a combination of polytetramethylene ether glycol (PTMG) and polyethylene glycol (PEG), the polyethylene glycol is used in an amount of 20 to 30.0 mol % based on the total amount of the polyols, diethylenetriamine is added in an amount of 100 ppm to 300 ppm on solids content during preparation of the spinning dope, and a capping ratio (CR) of the diisocyanate to the polyols in the prepolymer solution is 1.8 to 2.0.

8. The method of claim 7, wherein the polyethylene glycol (PEG) has a number-average molecular weight of 500 to 4,000.

9. Polyurethane-urea fiber obtained by dyeing the polyurethane-urea elastic yarn, set forth in claim 1, with reactive dye.

* * * * *